Feb. 15, 1955 G. GOLDBERG 2,702,067
MACHINE FOR MAKING COVERED APPAREL BELTS
Filed Sept. 19, 1952 4 Sheets-Sheet 1

GEORGE GOLDBERG
INVENTOR.

BY L. S. Michelman
atty.

Feb. 15, 1955 G. GOLDBERG 2,702,067
MACHINE FOR MAKING COVERED APPAREL BELTS
Filed Sept. 19, 1952 4 Sheets-Sheet 2

GEORGE GOLDBERG
INVENTOR.

BY *L. S. Michelman*
*atty.*

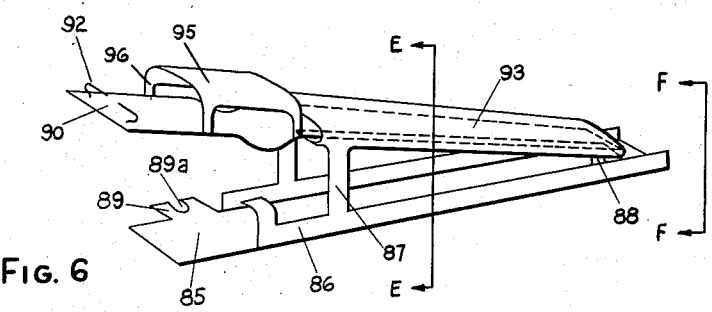
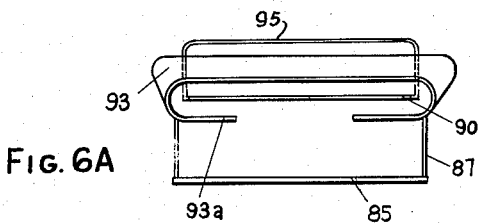
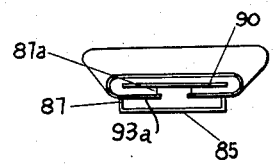
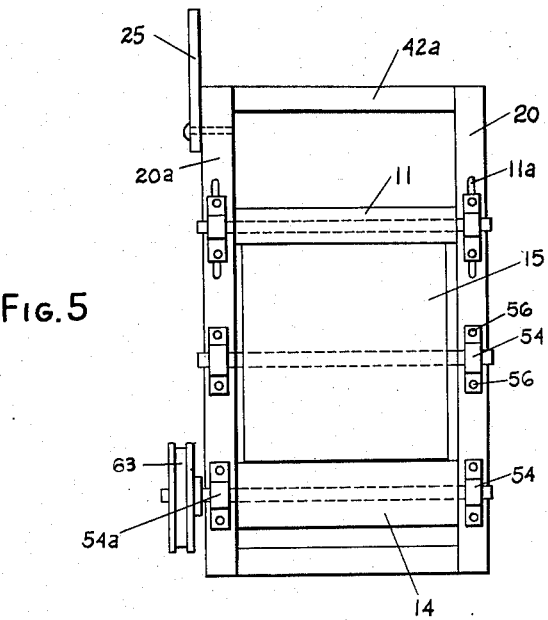

Feb. 15, 1955  G. GOLDBERG  2,702,067
MACHINE FOR MAKING COVERED APPAREL BELTS
Filed Sept. 19, 1952  4 Sheets-Sheet 4

GEORGE GOLDBERG
INVENTOR.

BY *L. S. Michelman*
Atty.

United States Patent Office 2,702,067
Patented Feb. 15, 1955

2,702,067

MACHINE FOR MAKING COVERED APPAREL BELTS

George Goldberg, Fall River, Mass., assignor to Metacomet Manufacturing Company, Inc., Fall River, Mass., a corporation of Massachusetts Application September 19, 1952, Serial No. 310,463

4 Claims. (Cl. 154—1.8)

This invention is concerned with a novel and new method of making covered belts. In the known process of making covered belts it has required a skilled stitcher, with years of experience, to turn out the finished product in quality and quantity. It is a principal object of this invention to provide a method of making a covered belt that will not require the services of a skilled stitcher, and yet to produce a belt that can be turned out in quality and in mass production.

In making a belt, for example, for a lady's dress, it is necessary to cut the cloth material to a size to match the backing material which is usually Leatherette. After this is done the cloth material, which incidentally may be the same material as the dress, must be stitched along its edges to the backing material. Since the Leatherette is of a different stretching and resiliency characteristic from the cloth or covering material, the stitching requires a high degree of skill, as a result of the cloth slipping over the Leatherette. In the method hereinafter to be described the difficulties mentioned will be overcome.

It is a further object of this invention to provide a novel machine for performing an operation that eliminates the requirement of a skilled stitcher.

It is yet another object of this invention to provide a novel and original belt structure.

It is a further object of this invention to be able to change to different widths of belts very quickly with no waste of material and without having to change but one element in the machine.

It is another object of the invention to keep the cloth covering clean.

It is an object of the invention to eliminate the necessity of heat in carrying out the process. This overcomes the possibility of the scorching of the materials.

Another object of the invention is to provide a method capable of making belts out of cloth that is even cut in the bias of the goods.

The method to obtain the objects mentioned and other objects consists in prefabricating the belt by taping the cloth to the backing prior to the stitching operation. The material is then held firmly to the backing so that the cloth and the backing have to pull through the sewing machine uniformly. A special guide is attached to the sewing machine so that any unskilled operator merely has to feed the belt into the guide and the stitching will be accurately spaced from the edge and uniform throughout.

For a more detailed understanding of the invention, reference is made to the following description:

Figure 5 is a view looking along line B—B of Figure 1.

Figure 6 is a view in perspective of the folder-combiner unit.

Figure 6a is a view taken along line E—E of Figure 6.

Figure 6b is a view along line F—F of Figure 6.

In the manufacture of belts in mass production at a low price, there has been an attempt previously to employ a machine. To date for various reasons these machines have failed to do the job as well as that done by a hand operation with the use of a sewing machine. After making a careful study of the problem, I have developed a process using a new type machine whereby a belt can be made that is of even better quality than previous ones made by hand and whereby the belts may be turned out in mass production.

Figure 1:
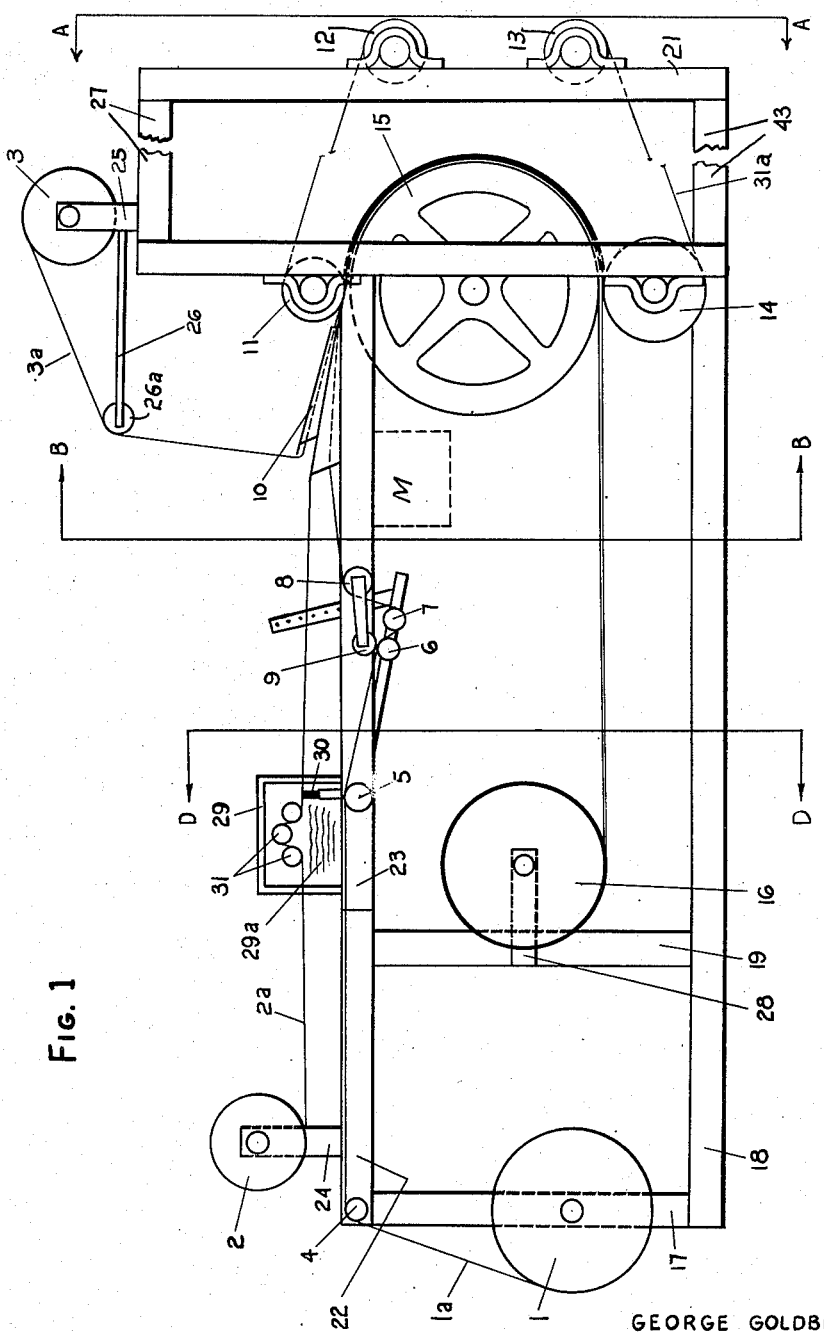
Figure 1 is a side elevation of the main parts of the combining machine.
Figure 8A:
Figure 8a is a cross section view of the belt.
Figure 8:
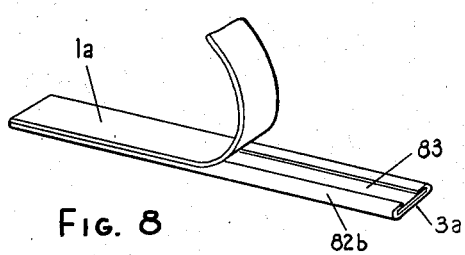
Figure 8 is a perspective view of a belt with the backing pulled away.
Figure 9:
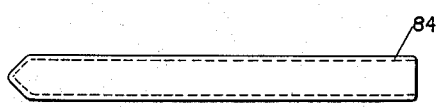
Figure 9 is a view of the finished belt.

For the purposes of explanation let us assume the belt is to have a Leatherette backing and a cover of a cotton fabric. The first operation of course is to cut the Leatherette to the desired width and place it upon a reel as at 1 in Figure 1. It is of course to be understood that the Leatherette is cut with a smooth edge. Several hundred feet may be rolled up on the reel 1. The cotton fabric which is to cover the belt must next be cut. The width of the cotton is not critical but must be from about ⅓ to ⅔ wider than the Leatherette. Note that any type of backing material may be used and any type of covering. After the cotton is cut, it is rolled on a reel or pulley as at 3. Now in order to get the belt together so that it will be ready for stitching, I have devised a machine shown in the drawings. Actually, a paper tape is employed. It is wet on one side. The cotton is folded around it so that the folds are adhered to the wet side leaving a central portion of the wet side exposed to adhere to the Leatherette. As a result of this, the covered surface of the belt remains clean since no part of the adhesive surface comes in contact with it. Reference can be made to the drawings wherein Figure 8 shows the belt with the Leatherette 1a broken away from the cotton 3a which is folded around the paper tape 2a as at 82b which are the folds. Between these folds 82b is the exposed central portion of the tape 83 which adheres to the Leatherette 1a. After this operation has been performed and the Leatherette 1a and cotton 3a are now one unit, any qualified sewing machine operator who does not have the skill of a belt stitcher can run a stitch around the outside of the belt. A buckle can be put on in the usual manner and holes can be punched and finished. As can be seen with the foregoing, the cost of manufacture is reduced, and many more belts than heretofore can be turned out in the equivalent amount of time.

In more detail the method of this invention is carried out as follows:

The Leatherette is fed along with gum tape and cloth through a specially designed folder-combiner. The three materials are pressed together as they are pulled and then stored on a reel. The folder is designed to prevent the moistened paper tape from sticking as it passes through it. The pressing means are designed so that by the time the materials have passed through it, the tape is already dry and the materials are smooth and without wrinkles. When the material is removed from the reel, it can be cut to proper length and is then available for stitching.

The sewing machine operator feeds the belt into the guide that is attached to the sewing machine starting at one end of the belt and stitching until approximately six inches from the end. The operator then tears back the tape for a half inch or so and folds a point. The operator then continues to sew going right around the point and back up the other side of the belt.

In order to carry out the combining operation, I have designed and constructed a new type of machine which can combine hundreds of feet of the covering and backing in but a few minutes.

Figure 2:
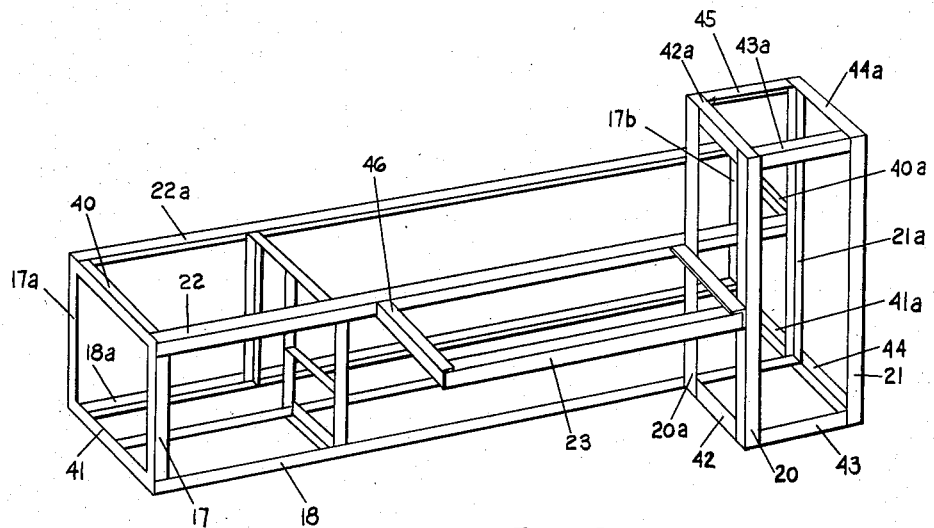
Figure 2 is a perspective view of the frame on which the elements of the machine of Figure 1 are mounted.

Reference is made to the drawings wherein Figure 2 shows the frame on which the various elements are mounted. On the vertical strip 17 is mounted the reel 1 (Figure 1) containing the Leatherette or backing which is designated as 1a. At the beam 22 is mounted the reel 2 containing the tape 2a. This reel 2 is mounted on a strut 24, which is vertically affixed to the beam 22. As can be seen from Figure 2 the main frame is rectangular and to its front and on the right is a tower. Atop the tower at 27 is mounted strut 25. To this strut is attached the reel 3 containing the covering or cotton material 3a.

The backing 1a takes the following path; it passes from the reel 1 over a guide 4 over a guide 5 and through a set of tensioning bars 6, 7, 8, and 9 into the bottom of a combiner-folder unit 10 where it meets the tape 2a and the cloth or covering 3a. The tape 2a takes the following path; it passes from the reel 2, which is incidentally just slightly higher than a water dispenser 29, into a water dispenser 29 through guiding bars 31 and over brush 30 which is saturated with the water 29a. From this point the tape 2a goes into the top of the combiner-folder 10, but in the lower portion of the top. The surface of 2a that is sticky is at the bottom. The cloth 3a takes the following path; from reel 3 it passes over roller 26a which is mounted on the support 26 and enters the top portion of the top of the folder-combiner 10. In the folder-combiner 10 the cloth 3a is folded around the tape so that its inside surface of the fold 82b as shown in Figures 8 and 8a is adhered to the wet side of the tape. Upon leaving the unit 10, the backing comes in contact with the remaining exposed surface of the tape 2a. At this point all the materials enter between the surface of pressure drum 15 and a belt 31a. The belt 31a exerts pressure on the drum 15. It is a continuous pulley and takes a path about pressure pulley 11, the drum 15, drive pulley 14, tension pulley 13 and tension pulley 12. By the time the belt has passed through and over the drum 15, the paper tape has dried and there is no danger of sticking when the reel 16 winds and takes up the slack.

The layout of the frame is not critical to the invention although the location of parts have been selected for the convenience of the machine operator.

As can be seen from Figure 2, the frame is essentially a rectangular three dimensional figure with the longest sides in a horizontal plane. These sides are designated as 22 and 22a, at the top and 18 and 18a at the bottom. The short top element is designated as 40 and its opposite member behind the tower is 40a. Below 40 is 41 and opposite 41 and below 40a is member 41a. Parallel to 22 is member 23 which connects with vertical member 20. Opposite 20 is 20a which is connected at its bottom to 18 and near its top to 22. To the right of 20 is vertical element 21 and behind it and opposite member 20a is member 21a which is also connected at its bottom to 18 and near its top to 22. Connected to 18 and 22 is member 17. Opposite 17 is 17a connected to 18a and 22a. Behind 21a is vertical member 17b. This is also connected to 18a and 22a. At the base of the tower between 20 and 20a is 42, between 20 and 21 is 43, and between 21 and 21a is 44. The reference above to the tower means the vertical members 20, 20a, 21, and 21a. Atop the tower are the members 42a, above 42, 43a above 43, 44a above 44, and 45 opposite 43a. Between members 22 and 23 is member 46 which is parallel to 42 and 42a. Mounted between 23 and 22 is the water dispenser 29 which is conventional having guide bars 31 water 29a and a brush or sponge 30 for wetting the tape.

Figure 3:
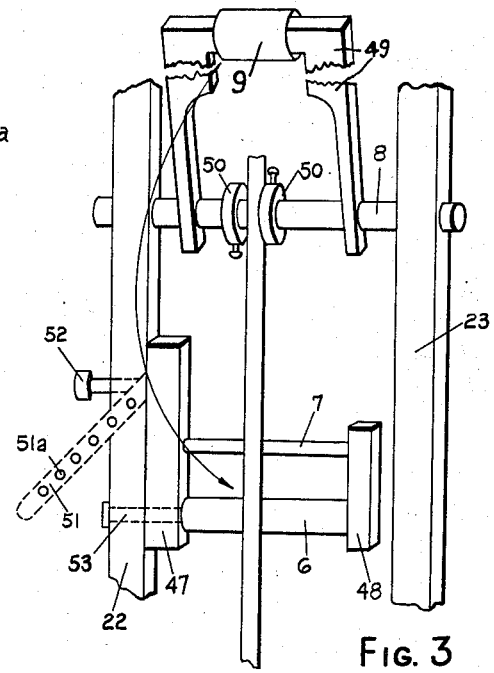
Figure 3 is a top view of the tensioning bars.

Next to the water dispenser 29 are a series of tensioning bars that can be best observed by reference to Figure 3. Pivotally mounted in member 22 by bolt 53 are tension bars 6 and 7. These are mounted on support member 47. Opposite 47 is support member 48 rigidly connected to 6 and 7. A control member 51 shown in dotted lines and in side view so as to be understood is movably connected to member 47. A bolt 52 is movably inserted in frame 22 and can be pushed into one of the openings 51a so as to control the position of member 47 which of course determines the elevation of bars 6 and 7. Rigidly connected between members 22 and 23 is tension bar 8. Movably connected to bar 8 are arms 49 which are made of a heavy metal. Connected between the arms is tension bar 9 which is movably mounted. Note in Figure 3 that arms 49 and bar 9 are placed in the direction of the arrow; and, in operation, bar 9 is above bar 6 and because of its added weight keeps the Leatherette smooth. On bar 8 are guide discs 50 which can be adjusted to the size of the belt. In operation the belt backing passes over bar 6 and of course under 9, under 7 and over 8, all of these bars cooperating to keep the backing material smooth and taut.

As already mentioned, the belt materials are pressed together by means of a belt 31a which passes over pulleys 11, 12, 13, 14 and 15. It is necessary to keep this belt under tension at all times in order to obtain efficient operation. Accordingly, pulley 12 is maintained under tension as can be seen by reference to Figure 4 which is a view of the end of the machine, looking at the tower. Members 21 and 21a have in them elongated openings 55. Mounted in these openings are bolts 56 which hold the support brackets 54 for the pulley 12. At the upper portion of the bracket 54 is a loop 57. To each of these loops is connected the end 58 of spring 59. The other end of spring 59 which is designated as 58a is connected to an opening (not shown in the drawings) which is in the bottom of the tension bolt 61. The tension bolt 61 is mounted in member 44a. The exact amount of tension is determined by means of the tension nut 62 which can control the length of the bolt.

Figure 4:
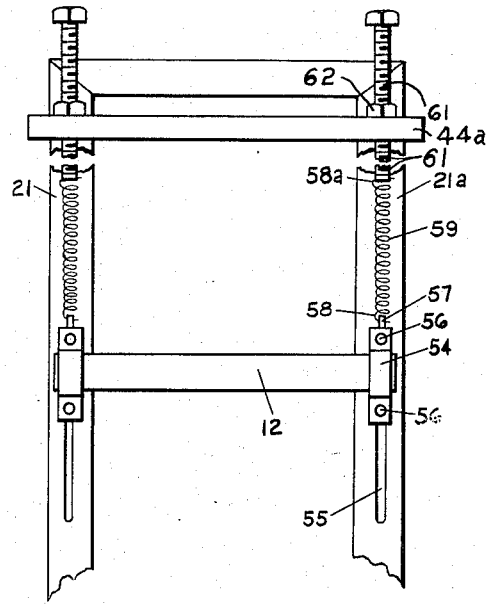
Figure 4 is a view looking along line A—A of Figure 1.

The tension system of Figure 4 operates as follows: The spring 59 exerts tension on brackets 54 which move up or down in openings 55 by means of bolts 56. When all of the slack is taken up in belt 31a the bolts 56 are locked in place. The tension in the springs is adjusted by the position of nut 62 which controls the length of bolt 61 between member 44a and the bracket 54.

Figure 5 shows a view of the other side of the tower taken along line B—B. The frame of that side of the tower comprises the vertical members 20 and 20a. The horizontal members are 42 and 42a. Mounted on 20 and 20a are brackets 54 which hold the pulleys 11 and 14, and drum 15. Bolts 56 secure the brackets to the frame. The bracket that holds pulley 11 is mounted in slots 11a in order to raise and lower pulley 11 as thicker material goes between the belt 31a and drum 15. At bracket 54a is mounted on the other side of pulley 14 a pulley 63. Pulley 63 is connected to a belt from pulley 69 of Figure 7 which for the sake of simplicity is now shown in the drawings. Pulley 63 causes pulley 14 to move. Since 14 is tangent to main pulley 15, it drives main pulley 15 by friction, and the belt 31a is pulled through turning the pulleys 11, 12, and 13.

Figure 7:
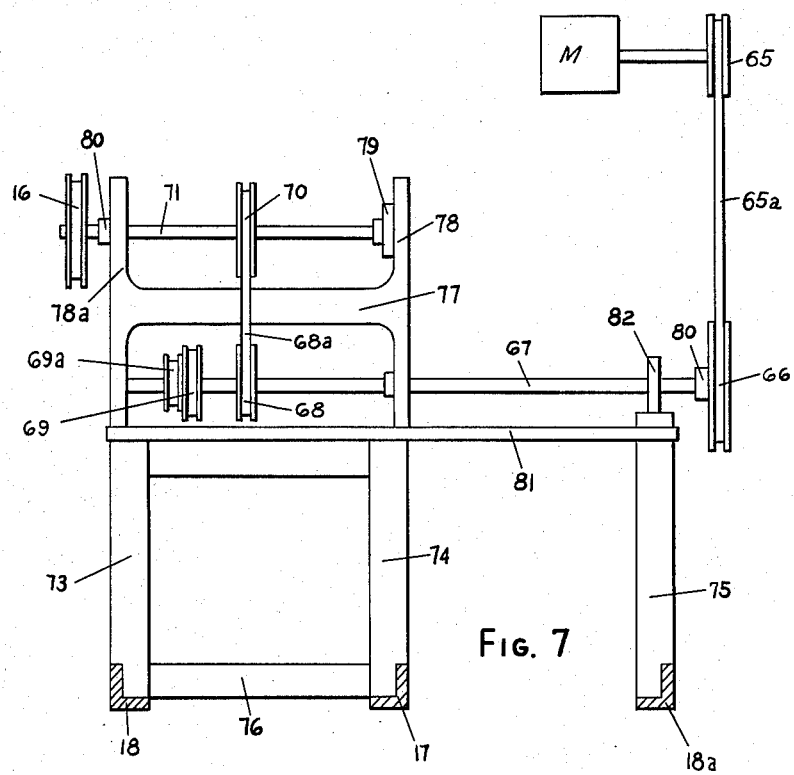
Figure 7 is a view taken along line D—D of Figure 1.

Figure 7 shows the arrangement of the drive pulleys or transmission system as it may be called. The motor M which may be mounted below the frame between 22 and 22a, has a pulley 65 mounted on its drive shaft. A belt 65a connects the pulley 65 with the pulley 66. Pulley 66 is mounted on drive shaft 67 which passes through support member 82, and terminates in member 78a. Mounted on drive shaft 67 is pulley 68. Also mounted on shaft 67 are pulleys 69 and 69a. Above shaft 67 and mounted on members 78 and 78a is shaft 71. On shaft 71 above pulley 68 is pulley 70 which is connected by a crossed belt 68a to pulley 68. The reason the pulley is crossed is in order to keep the motion of shaft 71 proper. Connected to shaft 71 on the outside of 78a is pulley 16 which winds the finished belt. The pulley 69 is connected to pulley 63 of Figure 5 by a belt which is not shown in the drawings. In the event it is desirable to change the speed and mechanical advantage, a smaller pulley 69a may be employed. As the reel 16 winds and increases in diameter, it is necessary to change the speed of rotation. The problem is overcome by a conventional clutch not shown.

It is necessary to have a sturdy frame to support the system of pulleys and shafts shown in Figure 7. Accordingly fastened to member 18 is a vertical member 73. A horizontal brace 76 is connected between 17 and 18. Connected to 17 is a vertical member 74 and connected to 18a is a vertical member 75. Member 81 connects 73, 74, and 75. Atop the horizontal member 81 is the support bracket 82. Also atop 81 is the H member which comprises the vertical members 78a and 78, and the cross horizontal connection 77. Shaft 71 which obtains its motion from pulley 70 is connected at one end to 79, a supporting bracket connected at 78. The other end of the shaft 71 passes through an opening in 78a, and as previously mentioned, is connected to the storage pulley 16 for winding up the finished belt. The members 80 are merely sleeves with set screws for locking them to the shaft. They act as spacers or guides.

At the bottom of the H member the shaft 67 is supported in members 78a and 78. The shaft passes through 78 and terminates in 78a.

In operation the motor is energized. The shaft 65 of the motor M turns pulley 65a which turns pulley 66 which turns shaft 67 which turns pulley 68 and 69 (also 69a). Pulley 68 turns belt 68a which turns shaft 71 which turns pulley 16. Pulley 69 turns a belt (not shown) which turns pulley 63 (Figure 5). Since pulley 63 is connected to the same shaft as pulley 14, pulley 14 turns. Pulley 14 is connected to belt 31a which is several inches wide. Belt 31a turns and turns pulleys 13, 12, 11, and drum 15. Since belt 31a is under pressure, the belt materials being all under belt 31a and atop drum 15, they are also under pressure. Accordingly the backing 1a, the tape 2a and the cloth 3a act as belts and turn reels 1, 2, and 3 respectively. This is the complete motion of the machine. All of the belting materials feed into the combiner-folder 10.

In Figures 6 and 6a are views of the combiner-folder. The lower portion 85 on which the Leatherette or backing 1a passes is arranged so as to line up the Leatherette and guide it in line with the cloth and tape which are located in the top 90. The sides 86 perform this function. In order to keep the sides 86 lined up with the top 90, connecting members 87 and 88 are employed. Connected to 85 at its bottom portion is a bracket 89 for connecting the entire assembly to the machine. The openings 89a are for receiving a nut-bolt assembly, which is connected to member 22 next to the tension bar 8. Connected to the upper portion 90 is a guide 92. This guides the paper tape 2a into the folder. The member portion 95 is connected at 96 to the portion 90. Connected to 95 is a tapered portion 93. As can be seen from Figure 6a, portion 95 supports 93 exclusively and 93 makes no contact with portion 90. Actually at the very end in Figure 6b, there are two uprights 87a to keep 90 and 93a spread properly and somewhat supported. Portion 93 folds around 90 and the lower fold portions are designated as 93a. In portion 90, there are slot openings to reduce the surface exposed to the tape. These have not been shown in the drawings as it is felt that they would tend to confuse rather than teach the invention. Their purpose is to keep the adhesive tape from sticking to the surface of the folds.

In operation the paper tape which is adhesive on its bottom enters between the guide 92 and the top of 90 until it meets the bottom 85. The cloth 3a passes between 95 and 90 and since it is wider than the tape, it follows the contour of 93 which tapers. Accordingly, the edges of the cloth 3a are folded in accordance with the shape of 93 and 93a. Upon contacting 85 cloth 3a is folded about tape 2a. Also upon contacting 85, backing 1a which is on 85 contacts the middle portion 83 of the tape 2a. These three materials pass between the drum 15 and the pulleys 11, and 14, and beneath the pressure belt 31, coming out stuck together as shown in Figure 8. The belt is rolled up on the storage reel 16 and the prefabrication operation is complete.

To summarize the operation of the machine, the motor M is energized. The shaft 65 of the motor M turns and pulley 65a turns with shaft 65 and turns pulley 66. Pulley 66 is connected to shaft 67 and shaft 67 turns. Pulleys 68 and 69 (69a also) turn with shaft 67. Belt 68a turns with pulley 68, turning pulley 70. Shaft 71 turns with pulley 70 and winder 16 being on shaft 71 turns. Pulley 69 is connected by a belt not shown to pulley 63 in Figure 5. Since pulley 63 is connected to friction pulley or drive pulley 14, 14 turns. Pulley 14 as it turns causes belt 31 to rotate imparting motion to pulleys 13, 12, 11 and drum 15. Backing material 1a which is wound on roller 1 moves over bar 4 over bar 5 over 6 but under 9, under 7 and over 8 through the lower elevation of combiner-folder 10 where it joins the tape 2a and cloth 3a. Tape 2a which is stored on reel 2 passes through water dispenser 29 and over brush 30 whereby its lower surface is moistened and made sticky into upper elevation of folder combiner 10. Cloth 3a which is stored on reel 3 passes over guide 26a into the upper elevation of combiner-folder 10 above the dry surface of tape 2a. Since the cloth is wider than the tape, it is folded around the tape as already mentioned. The tape covered with the cloth enters beneath the belt 31a along with the backing 1a and passes over drum 15 at all times under the pressure of belt 31a. Upon leaving pulley 14 and drum 15, the prefabricated belt is wound on the storage reel 16 which is in motion from the transmission system previously described.

The above mentioned description is but one embodiment of this invention although equivalent components and arrangements may be employed without departing from the spirit or scope of the invention.

The dimensions of the parts and components have been exaggerated in order to better understand the invention.

I claim:

1. For prefabricating a covered belt, a machine comprising a reel of backing material, a reel of covering, and a reel of tape, a means for making said tape adhesive, bars for controlling the tension of said backing material, a folder for wrapping said covering around said tape, combining means for making said backing and said covered tape integral, compression means for smoothing and pulling said materials, and a means for storing the materials after they have been smoothed.

2. For prefabricating a covered belt, a machine having a motor comprising a frame, a reel for backing material mounted on said frame, a reel for tape mounted on said frame, a reel for covering mounted on said frame, a means for making said tape adhesive, a combiner-folder for folding said covering around said tape and sticking said backing to said tape, a large drum, a compression belt for removing wrinkles and pressing materials together as said materials pass over said drum and beneath said belt, a drive pulley from said motor and a transmission system connected from said motor to said drive pulley.

3. For prefabricating a covered belt, a machine comprising a horizontal frame portion and a vertical frame portion, a reel for storing backing material mounted on said horizontal frame portion, a reel for storing tape also mounted on said horizontal portion, a dispenser for making said tape adhesive, mounted next to said tape reel, bars mounted next to said bath for controlling the tension of said backing material, a reel of covering mounted on said vertical frame portion, a combiner-folder on said horizontal portion, a large drum mounted on said vertical portion, a compression belt movably in contact with said drum, said combiner-folder folding said covering around said tape and uniting said backing with said tape, said compression belt pressing said materials around said drum, and a reel for storing said tape, backing, and covering after being combined as aforementioned.

4. For prefabricating a covered belt, a machine comprising a reel for storing backing material, a reel for storing tape, a reel for storing covering, a dispenser for making the tape adhesive, bars for tensioning the backing, a folder-combiner for folding the covering around the tape and combining the backing with the covered tape, a drum, a belt pulley-system consisting of four pulleys and a belt, one pulley above said drum and tangent to it, a second pulley below said drum and tangent to it, a third pulley under tension, and a fourth pulley below said third pulley, a transmission system connected to said second pulley for imparting motion to said belt, said drum and pulley-system whereby the backing, tape, and covering are pulled between the belt and the surface of the large drum.

References Cited in the file of this patent

UNITED STATES PATENTS

| Number | Name | Date |
|---|---|---|
| 233,414 | Hays et al. | Oct. 19, 1880 |
| 694,099 | Hale | Feb. 25, 1902 |
| 1,174,070 | Hosford | Mar. 7, 1916 |
| 1,258,945 | Rohrberg | Mar. 12, 1918 |
| 1,802,097 | Wagenfeld | Apr. 21, 1931 |
| 1,802,243 | Fisher | Apr. 21, 1931 |
| 2,124,210 | Prindle | July 19, 1938 |
| 2,266,953 | Blue | Dec. 23, 1941 |
| 2,368,445 | Brandt | Jan. 30, 1945 |
| 2,602,932 | Eaton | July 15, 1952 |